United States Patent
Tran et al.

(10) Patent No.: US 11,649,142 B2
(45) Date of Patent: May 16, 2023

(54) CRANE PAYLOAD STABILIZATION

(71) Applicant: INTERNATIONAL BUSINESS MACHINES CORPORATION, Armonk, NY (US)

(72) Inventors: Khoi-Nguyen Dao Tran, Southbank (AU); Jorge Andres Moros Ortiz, Melbourne (AU); John Wagner, Carlton (AU); Timothy M. Lynar, Dickson (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 887 days.

(21) Appl. No.: 16/550,399

(22) Filed: Aug. 26, 2019

(65) Prior Publication Data

US 2021/0061620 A1    Mar. 4, 2021

(51) Int. Cl.
B66C 13/06 (2006.01)
G06T 17/05 (2011.01)
G01W 1/06 (2006.01)

(52) U.S. Cl.
CPC ............. B66C 13/063 (2013.01); G01W 1/06 (2013.01); G06T 17/05 (2013.01)

(58) Field of Classification Search
CPC ......... B66C 13/063; G01W 1/06; G06T 17/05
See application file for complete search history.

(56) References Cited

U.S. PATENT DOCUMENTS

| | | | |
|---|---|---|---|
| 3,532,324 A | 10/1970 | Crittenden | |
| 3,945,504 A | 3/1976 | Wright | |
| 4,227,677 A | 10/1980 | Bernaerts | |
| 5,961,563 A | 10/1999 | Overton | |
| 2009/0152391 A1* | 6/2009 | McWhirk | B64B 1/70 244/30 |
| 2010/0230370 A1* | 9/2010 | Schneider | B63B 27/10 701/50 |
| 2014/0263141 A1* | 9/2014 | May | B66C 21/04 212/242 |

FOREIGN PATENT DOCUMENTS

| | | |
|---|---|---|
| CN | 201751365 U | 2/2011 |
| CN | 103086280 B | 7/2015 |

(Continued)

OTHER PUBLICATIONS https://edition.cnn.com/style/article/new-york-slender-skyscrapers/index.html, "The slender skyscrapers changing New York's skyline", Style Cities, Architecture, Accessed on Aug. 13, 2019, 20 pages.

(Continued)

*Primary Examiner* — Peter D Nolan
*Assistant Examiner* — Demetra R Smith-Stewart
(74) *Attorney, Agent, or Firm* — Rakesh Roy (57) ABSTRACT

A method, computer system, and a computer program product for payload stabilization is provided. The present invention may include, in response to receiving at least one sensor data associated with a suspended payload, detecting an unstable movement in the suspended payload during a transport of the suspended payload. The present invention may also include implementing at least one sail coupled to the suspended payload to stabilize the detected unstable movement of the suspended payload.

20 Claims, 8 Drawing Sheets

(56) References Cited

FOREIGN PATENT DOCUMENTS

| | | | |
|---|---|---|---|
| CN | 204823812 U | 12/2015 | |
| EP | 3064465 B1 | 10/2017 | |
| GB | 2097052 A * | 10/1982 | ............ A62B 35/04 |
| JP | 2019052882 A | 4/2019 | |
| WO | WO-2019136007 A1 * | 7/2019 | |

OTHER PUBLICATIONS

IDJ, "Gwulo: Old Hong Kong", HSBC headquarters-construction cranes with wind-sails-1983, https://gwulo.com/atom/27974, Accessed on Aug. 13, 2019, 5 pages.
Interesting Engineering, "The World's Strangest Boats: Sailboats Without Sails", Accessed on Aug. 13, 2019, 10 pages.
Mell et al., "The NIST Definition of Cloud Computing", Recommendations of the National Institute of Standards and Technology, Special Publication 800-145, Sep. 2011, 7 pages.
Vertikal, "Retractable windsails for tower cranes", News, All News, Jul. 10, 2016, Accessed on Aug. 13, 2019, 4 pages.

\* cited by examiner

CRANE PAYLOAD STABILIZATION

BACKGROUND

The present invention relates generally to the field of computing, and more particularly to industrial construction technology.

The rate of skyscraper developments and other urban construction projects have been increasing to accommodate the population growth in cities around the world. Constructing and maintaining skyscrapers often utilize large crane systems to transport heavy payloads, such as, steel beams, steel reinforcements, glass windows, and other building materials. Although cranes are efficient at transporting heavy payloads to great heights, the safe operation of cranes are often limited by wind and other weather conditions.

SUMMARY

Embodiments of the present invention disclose a method, computer system, and a computer program product for payload stabilization. The present invention may include, in response to receiving at least one sensor data associated with a suspended payload, detecting an unstable movement in the suspended payload during a transport of the suspended payload. The present invention may also include implementing at least one sail coupled to the suspended payload to stabilize the detected unstable movement of the suspended payload.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for crane payload stabilization. As such, the present embodiment has the capacity to improve the technical field of industrial construction by automatically adjusting one or more computer-controlled sails to stabilize the movement of a platform transporting a payload. More specifically, a stabilization program may monitor one or more weather conditions, such as, the wind speed and direction in a work environment (e.g., payload work environment), as well as the movement of the platform transporting the payload. Then, if the stabilization program detects instability, such as, an uncontrolled swaying in the movement of the payload, the stabilization program may implement one or more computer-controlled sails coupled to the platform to reduce the swaying or create a predictable swaying of the payload. The stabilization program may continue to monitor the work environment and adjust the sails as applicable to stabilize the payload, until the payload transport is completed.

As described previously, the rate of skyscraper developments and other urban construction projects have been increasing to accommodate the population growth in cities around the world. Constructing and maintaining skyscrapers often utilize large crane systems to transport heavy payloads, such as, steel beams, steel reinforcements, glass windows, and other building materials. Although cranes are efficient at transporting heavy payloads to great heights, the safe operation of cranes are often limited by wind and other weather conditions.

Therefore, it may be advantageous to, among other things, provide a way to detect an unstable movement of a suspended payload during a transport of the suspended payload, and to further implement one or more computer-controlled sails coupled to the suspended payload to stabilize the detected unstable movement of the suspended payload. Additionally, it may be advantageous to, among other things, determine how best to implement the one or more computer-controlled sails based on movement data associated with the suspended payload, weather data associated with a work environment, and a three-dimensional (3D) model representing the work environment.

According to at least one embodiment, a stabilization system may provide a solution to reduce lateral movements (e.g., swaying) or create predictable swaying of crane payloads by using sails mounted on a sensor-informed payload platform for construction cranes. In one embodiment, the sails may include fabric sails which may be deployed as applicable in windy conditions. In another embodiment, the sails may include rotary sails (e.g., flettner rotors). According to one embodiment, the stabilization system may use the sensors on the payload platform as well as weather data from external sensors and forecasting models to implement the sails to redirect or counteract wind conditions to allow predictable swaying or reduce the swaying of crane payloads altogether. As such, the stabilization system may enable the safe operation of cranes in low to moderate wind conditions.

Figure 1:
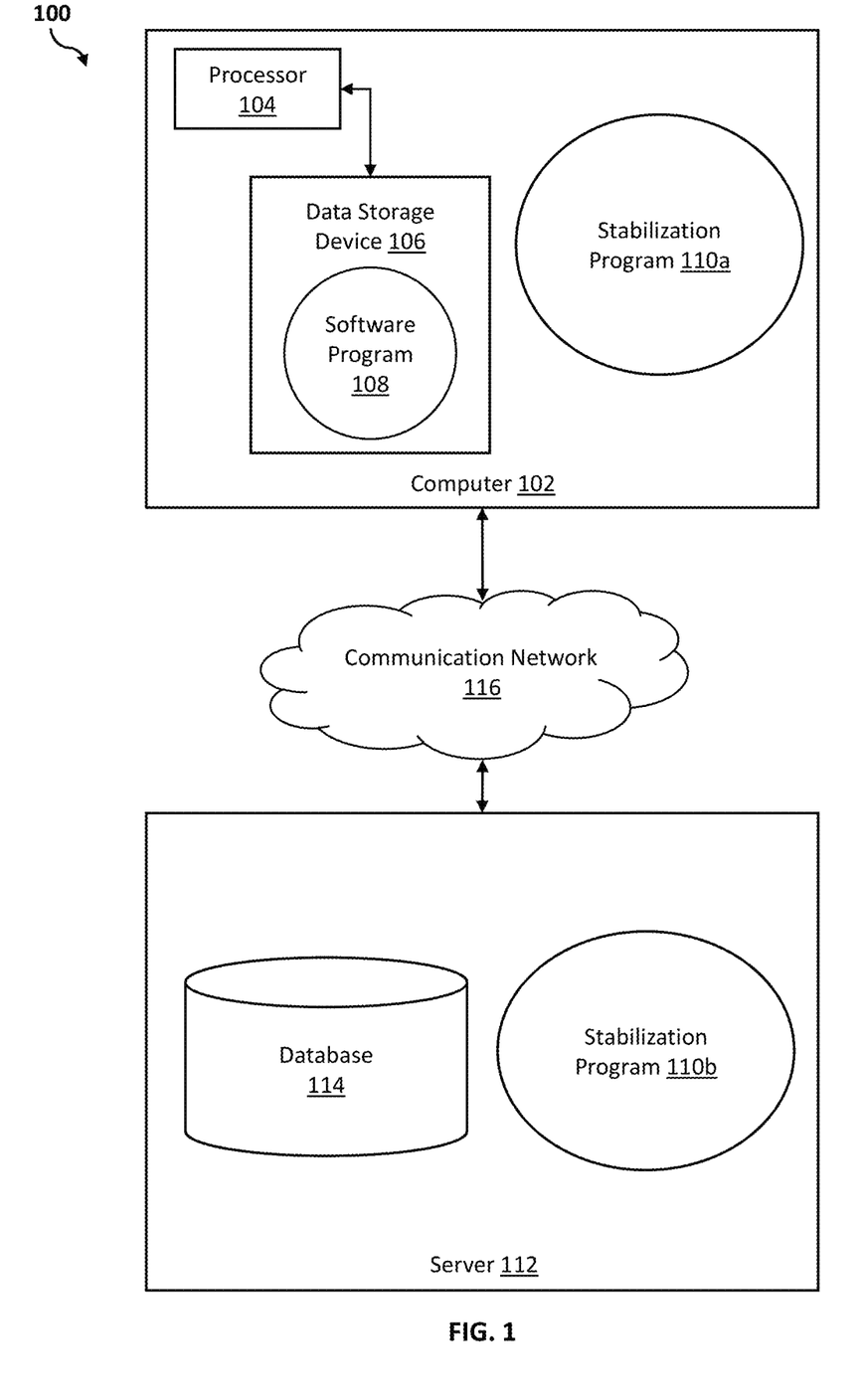
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a stabilization program 110a. The networked computer environment 100 may also include a server 112 that is enabled to run a stabilization program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the stabilization program 110a, 110b may interact with a database 114 that may be embedded in various storage devices, such as, but not limited to a computer/mobile device 102, a networked server 112, or a cloud storage service.

Figure 2:
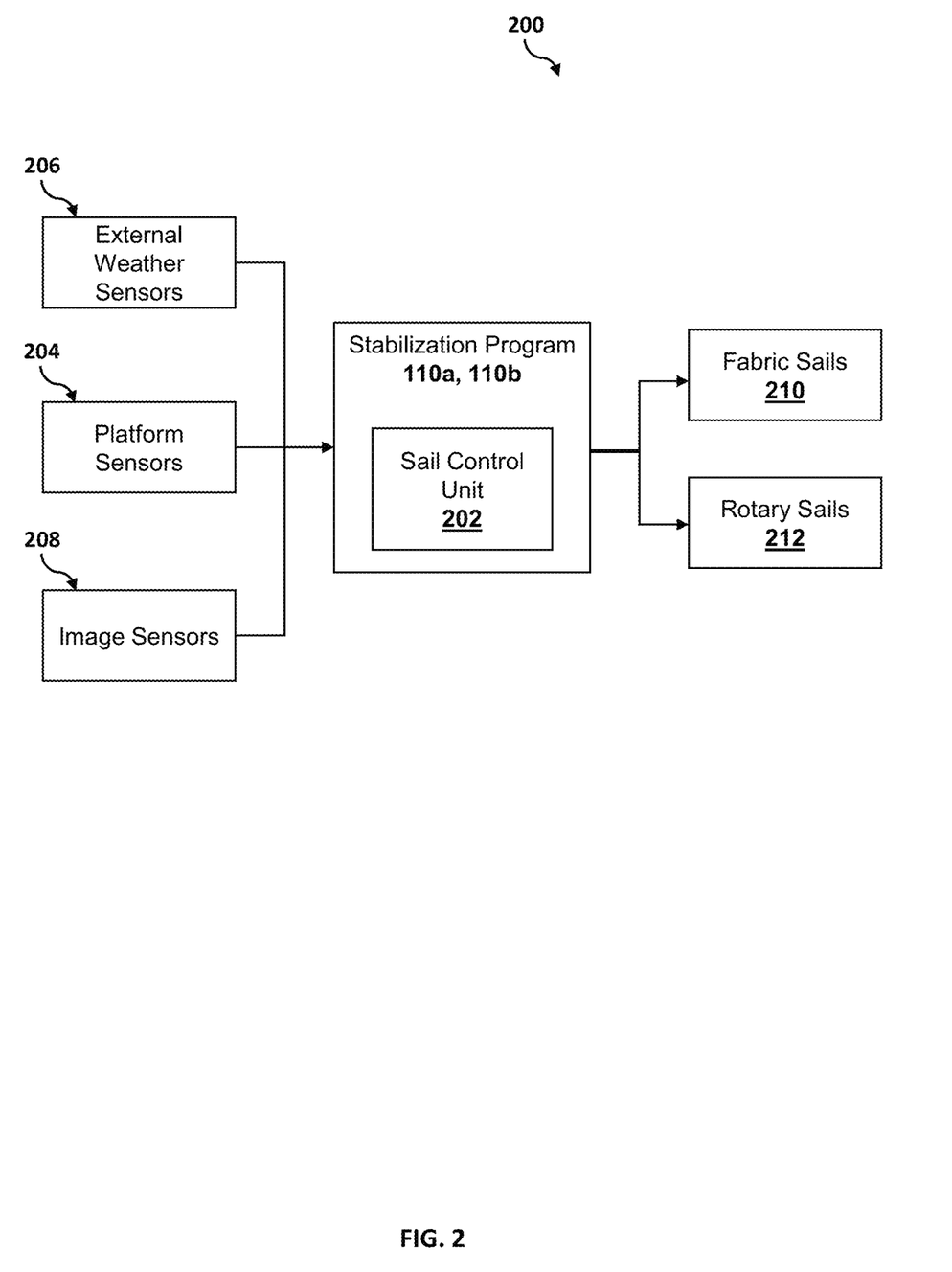
FIG. 2 is a block diagram of a stabilization system according to at least one embodiment.

Referring now to FIG. 2, a block diagram illustrating a stabilization system 200 according to at least one embodiment is depicted.

According to one embodiment, the stabilization system 200 may be provided in the networked computer environment 100 and may be implemented on one or more client computers 102 and/or one or more server computers 112 to detect an unstable movement of a suspended payload during a transport of the suspended payload and implement one or more computer-controlled sails coupled to the suspended payload to stabilize the detected unstable movement of the suspended payload.

According to one embodiment, the stabilization system 200 may generally include the stabilization program 110a, 110b. The stabilization program 110a, 110b may include a single computer program or multiple program modules or sets of instructions being executed by the processor of the client computer 102/server computer 112. The stabilization program 110a, 110b may include routines, objects, components, units, logic, data structures, and actions that may perform particular tasks or implement particular abstract data types. The stabilization program 110a, 110b may be practiced in distributed cloud computing environments where tasks are performed by remote processing devices that may be linked through the communication network 116. In one embodiment, the stabilization program 110a, 110b may include, for example, a sail control unit 202 to control one or more sails coupled to a suspended payload to stabilize a detected unstable movement of the suspended payload.

According to one embodiment, the stabilization system 200 may also include one or more platform sensors 204, one or more external weather sensors 206, and one or more image sensors 208. According to one embodiment, the stabilization system 200 may also include one or more fabric sails 210 and one or more rotary sails (e.g., flettner sails) 212.

According to one embodiment, the platform sensors 204 may be mounted onto a platform configured to support a payload. The platform sensors 204 may collect a set of movement data which may be analyzed to determine a position and orientation of the platform and/or the payload supported on the platform. More specifically, the movement data may be used to calculate tilt, rotation, sway, and/or shake in the movement of the platform and/or the payload. In one embodiment, the platform sensors 204 may include a tilt sensor, a rotational sensor, and a proximity sensor. In at least one embodiment, the platform sensors 204 may include an accelerometer and a gyroscope. In another embodiment, the platform sensors 204 may also include a wind sensor (e.g., anemometer, wind vane). According to one embodiment, the platform sensors 204 may transmit the set of movement data to the client computer 102 or the server computer 112 running the stabilization program 110a, 110b via the communication network 116.

According to one embodiment, the external weather sensors 206 may collect a set of weather data which may be analyzed to determine a wind condition (e.g., wind speed and direction) and/or other weather condition (e.g., rain) in a work environment. In one embodiment, the external weather sensors 206 may be mounted on the platform of the crane. In another embodiment, the external weather sensors 206 may be mounted on a location separate from the platform of the crane, such as, for example the body of the crane (e.g., mast, jib) or another structure within proximity of the work environment (e.g., nearby building). In at least one embodiment, the set of weather data may be collected from external weather sensors 206 located in a remote weather station. In at least one embodiment, the external weather sensors 206 may include a thermometer (e.g., measuring temperature), a barometer (e.g., measuring precipitation), a hygrometer (e.g., measuring humidity), an anemometer (e.g., measuring wind speed), and a wind sock/wind vane (e.g., measuring wind direction). According to one embodiment, the external weather sensors 206 may transmit the set of weather data to the client computer 102 or the server computer 112 running the stabilization program 110a, 110b via the communication network 116.

According to one embodiment, the image sensors 208 may collect a set of image data (e.g., set of digital images or video) which may be used to reconstruct a three-dimensional (3D) model or virtual representation of the work environment. In one embodiment, the image sensors 208 may include one or more cameras or 3D scanners which may scan (e.g., acquire images of) the platform, the payload supported on the platform, and one or more buildings or structures in the proximity of the work environment. The set of image data may then be reconstructed to generate a 3D model of the platform, the payload, and the one or more buildings or structures in the proximity of the work environment. According to one embodiment, the image sensors 208 may transmit the set of image data to the client computer 102 or the server computer 112 running the stabilization program 110a, 110b via the communication network 116. According to another embodiment, the image sensors 208 may transmit at least one 3D model of the work environment, generated using the set of image data, to the client computer 102 or the server computer 112 running the stabilization program 110a, 110b via the communication network 116.

According to one embodiment, the stabilization program 110a, 110b may provide a workflow (e.g., events, tasks, or instructions that may be executed by the processor of the client computer 102/server computer 112) to enable receiving (e.g., via communication network 116) an input, including, the set of movement data from the platform sensors 204, the set of weather data from the external weather sensors 206, and the set of image data (or at least one 3D model generated using the set of image data) from the image sensors 208. Based on the input, the stabilization program 110a, 110b may implement the sail control unit 202 to determine how best to implement the fabric sails 210 and/or the rotary sails 212 to maintain a predetermined (e.g., stable) movement of a payload suspended from the crane (i.e., suspended payload) during a transport of the suspended payload. The fabric sails 210 will be discussed further with reference to similar fabric sails 318 shown in FIG. 3 and the rotary sails 212 will be discussed further with reference to similar rotary sails 418 shown in FIG. 4.

Figure 3:
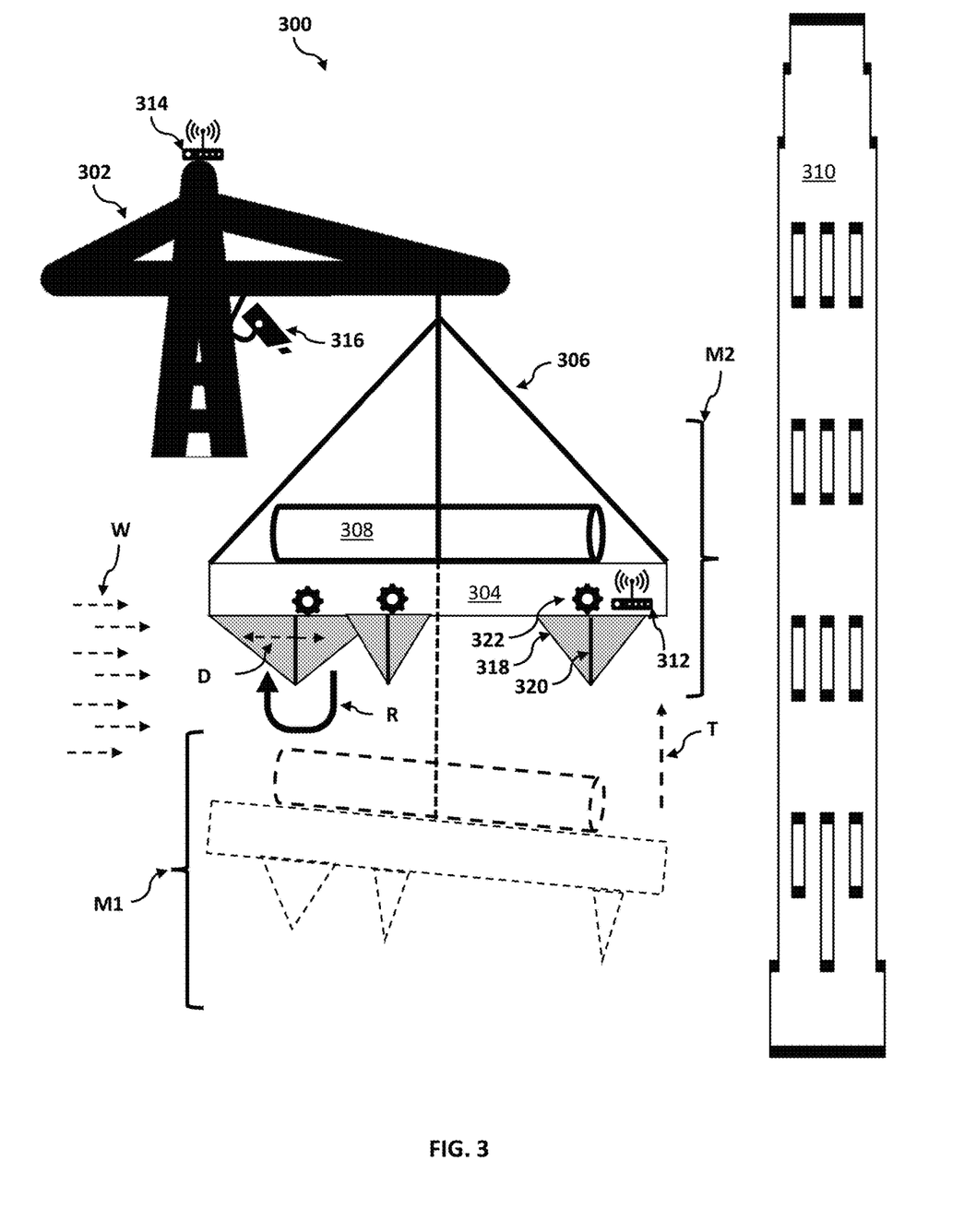
FIG. 3 is a block diagram of a first illustrative work environment implementing the stabilization system of FIG. 2, according to at least one embodiment.

Referring now to FIG. 3, an exemplary illustration of a work environment (e.g., payload work environment) 300 using the stabilization system 200, as described in connection to FIG. 2, according to at least one embodiment is depicted.

According to one embodiment, the work environment 300 illustrated in FIG. 3 may include a construction crane (i.e., crane) 302 having a crane platform (i.e., platform) 304 suspended using a rope or tether 306. The crane 302 may be used to transport a payload 308 to a location of a building (e.g., skyscraper) 310. Specifically, the payload 308 may be loaded onto the platform 304 and transported (e.g., hoisted) to a destination in the building 310. In at least one embodiment, the payload 308 on the platform 304 may be referred to as the suspended payload 308.

According to one embodiment, the stabilization system 200 described in FIG. 2 may be incorporated into the work environment 300. In one embodiment, the platform 304 may include one or more platform sensors 312, similar to the platform sensor 204 previously described in FIG. 2. Further, one or more external weather sensors 314, similar to the external weather sensor 206 previously described in FIG. 2, may be provided in the work site 300. In one embodiment, the external weather sensor 314 may be mounted on the crane 302, as depicted in FIG. 3. In addition, one or more image sensors 316, similar to the image sensor 208 previously described in FIG. 2, may be provided in the work site 300. In one embodiment, the image sensor 316 may include a camera mounted on the crane 302, as depicted in FIG. 3.

According to one embodiment, the platform 304 may include one or more fabric sails 318 mounted thereon, similar to the fabric sails 210 previously described in FIG. 2. In one embodiment, the fabric sails 318 may be mounted on a bottom portion of the platform 304, opposite a top portion (e.g., payload area) supporting the payload 308, as illustrated in FIG. 3. However, in at least one embodiment, the fabric sails 318 may be mounted on any suitable portion of the platform 304 (e.g., sides of the platform 304). According to one embodiment, the fabric sails 318 may include respective sail masts 320 and may be actuated by respective sail motors 322, such that each fabric sail 318 may be independently movable. In another embodiment, the fabric sails 318 may be actuated by a single (e.g., central) sail motor 322. In one embodiment, the sail control unit 202 of the stabilization program 110a, 110b may communicate (e.g., via communication network 116) with the one or more sail motors 322 to implement the sail motors 322 to extend and retract one or more of the fabric sails 318 from the respective sail mast 320. In another embodiment, the sail control unit 202 may also actuate the sail motors 322 to rotate the fabric sails 318 around the respective sail masts 320 (e.g., along the base of the fabric sail/platform) or otherwise move the fabric sails 318.

According to one embodiment, during a transport T of the suspended payload 308, the platform sensor 312, the external weather sensor 314, and/or the image sensor 316 may collect and transmit (e.g., via communication network 116) to the stabilization program 110a, 110b, one or more sensor data associated with a wind condition W in the work environment 300 and the impact of the wind condition W (e.g., wind speed, wind direction) on a position and orientation of the suspended payload 308 on the platform 304. In response to receiving the one or more sensor data associated with the suspended payload 308, the stabilization program 110a, 110b may detect an unstable movement M1 (e.g., unpredicted swaying) in the suspended payload 308. Then, the stabilization program 110a, 110b may implement the sail control unit 202 to communicate with the sail motors 322 to perform a deployment D (e.g., extend) of the fabric sails 318 from the respective sail masts 320 and perform a rotation R of the fabric sails 318. In one embodiment, the sail control unit 202 may cause the sail motors 322 to change a direction of the fabric sails 318 in order to channel the wind (e.g., of the wind condition W) in a controllable and predictable direction. As such, the stabilization program 110a, 110b may implement (e.g., deploy, actuate, adjust) the fabric sails 318 to stabilize the detected unstable movement M1 and provide a stable movement M2 of the suspended payload 308 during the transport T of the suspended payload 308.

In one embodiment, the sail control unit 202 may monitor and model (e.g., using image data received from the image sensor 316) the fabric sails 318 to enable the platform 304 and the suspended payload 308 to maintain the stable movement M2 (e.g., predetermined, calculated movement) during the transport T of the suspended payload 308.

Figure 4:
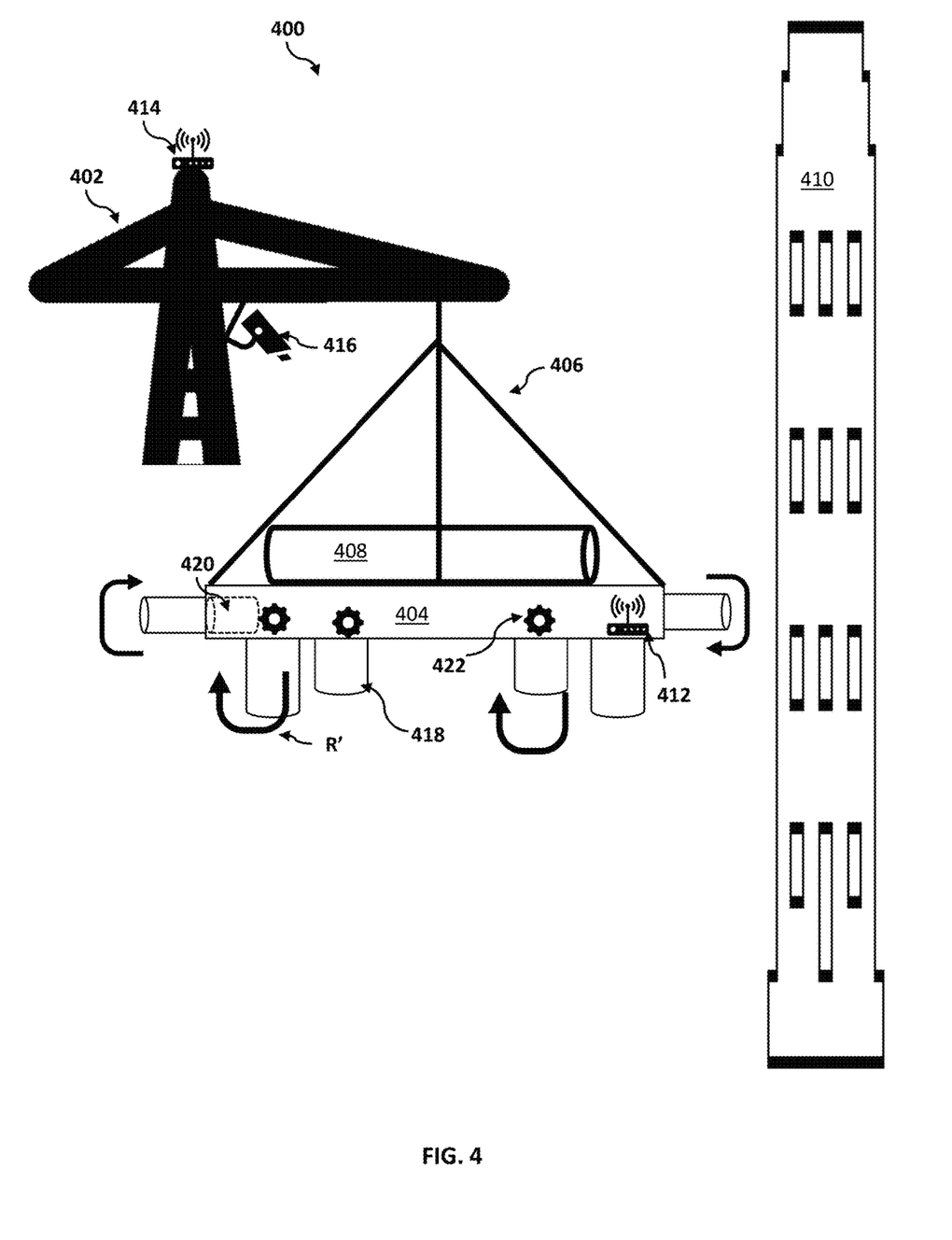
FIG. 4 is a block diagram of a second illustrative work environment implementing the stabilization system of FIG. 2, according to at least one embodiment.

Referring now to FIG. 4, an exemplary illustration of a work environment (e.g., payload work environment) 400 using the stabilization system 200, as described in connection to FIG. 2, according to at least one embodiment is depicted.

According to one embodiment, the work environment 400 illustrated in FIG. 4 may be similar, in some aspects, to the work environment 300 illustrated in FIG. 3. In one embodiment, the work environment 400 may include a crane 402 having a platform 404 suspended using a rope or tether 406. The crane 402 may be used to transport a payload 408 to a location of a building 410. Specifically, the payload 408 may be loaded onto the platform 404 and transported (e.g., hoisted) to a destination in the building 410. In at least one embodiment, the payload 408 on the platform 404 may be referred to as the suspended payload 408.

According to one embodiment, the stabilization system 200 described in FIG. 2 may be incorporated into the work environment 400. In one embodiment, the platform 404 may include one or more platform sensors 412, similar to the platform sensor 204 previously described in FIG. 2. Further, one or more external weather sensors 414, similar to the external weather sensor 206 previously described in FIG. 2, may be provided in the work site 400. In one embodiment, the external weather sensor 414 may be mounted on the crane 402. In addition, one or more image sensors 416, similar to the image sensor 208 previously described in FIG. 2, may be provided in the work site 400. In one embodiment, the image sensor 416 may include a camera mounted on the crane 402.

According to one embodiment, the platform 404 may include one or more rotary sails 418 mounted thereon, similar to the rotary sails 212 previously described in FIG. 2. In one embodiment, the rotary sails 418 may include flettner rotors having cylindrical bodies that may rotate along its long axis. In another embodiment, the rotary sails 418 may include any other shape (e.g., cuboid) suitable for rotating along its long axis. The rotary sails 418 may be constructed using metals (e.g., aluminum) and/or composite materials (e.g., carbon fiber).

According to one embodiment, the rotary sails 418 may be rotatably fixed to an underside portion of the platform 404 such that the rotary sails 418 may perform as platform stands when the platform 404 is on the ground (e.g., not in use). In another embodiment, the platform 404 may include a rotor housing 420 which may house the respective rotary sail 418 when the rotary sail 418 is not in use.

In at least one embodiment, the rotary sails 418 may be mounted on, and extend from, any suitable portion of the platform 404 (e.g., sides of the platform 404). According to one embodiment, the rotary sails 418 may be actuated by respective sail motors 422, such that each rotary sail 418 may be independently rotatable. In another embodiment, the rotary sails 418 may be actuated by a single (e.g., central) sail motor 422. In one embodiment, the sail control unit 202 of the stabilization program 110a, 110b may communicate (e.g., via communication network 116) with the one or more sail motors 422 to implement the sail motors 422 to extend and retract one or more of the rotary sails 418 from the respective sail housing 420 (e.g., if the platform 404 includes respective sail housings 420). In another embodiment, the sail control unit 202 may also actuate the sail motors 422 to perform a rotation R' of the rotary sails 418 along the Y-axis (e.g., long axis) of the rotary sails 418. As the rotary sails 418 rotate, the rotary sails 418 may exert a directional force on the air in the work environment 400, under the principles of the Magnus effect. Under the Magnus effect, the rotary sails 418 may generate a force that is perpendicular to both the direction of the wind and an axis of the rotation R' of the rotary sails 418 (e.g., long axis of the rotary sails 418). By controlling the direction and speed of rotation, the rotary sails 418 may disrupt the movement of the air (e.g., wind) and generate aerodynamic forces (e.g., lift or downforce) to rotate the platform 404 and the suspended payload 408 or counteract wind effects to stabilize the platform 404 and the suspended payload 408. According to at least one embodiment, one or more fabric sails 318 and one or more rotary sails 418 may be used in combination on the same platform (e.g., platform 304, platform 404).

According to the present embodiment, a user using a client computer 102 or a server computer 112 may use the stabilization program 110a, 110b (respectively) to stabilize a detected unstable movement of a suspended payload. The stabilization method is explained in more detail below with respect to FIGS. 2-4 (detailed above) and FIG. 5 (detailed below).

According to one embodiment, the stabilization method may generally include, in response to receiving at least one sensor data associated with a suspended payload, detecting an unstable movement in the suspended payload during a transport of the suspended payload and implementing at least one sail coupled to the suspended payload to stabilize the detected unstable movement of the suspended payload.

Figure 5:
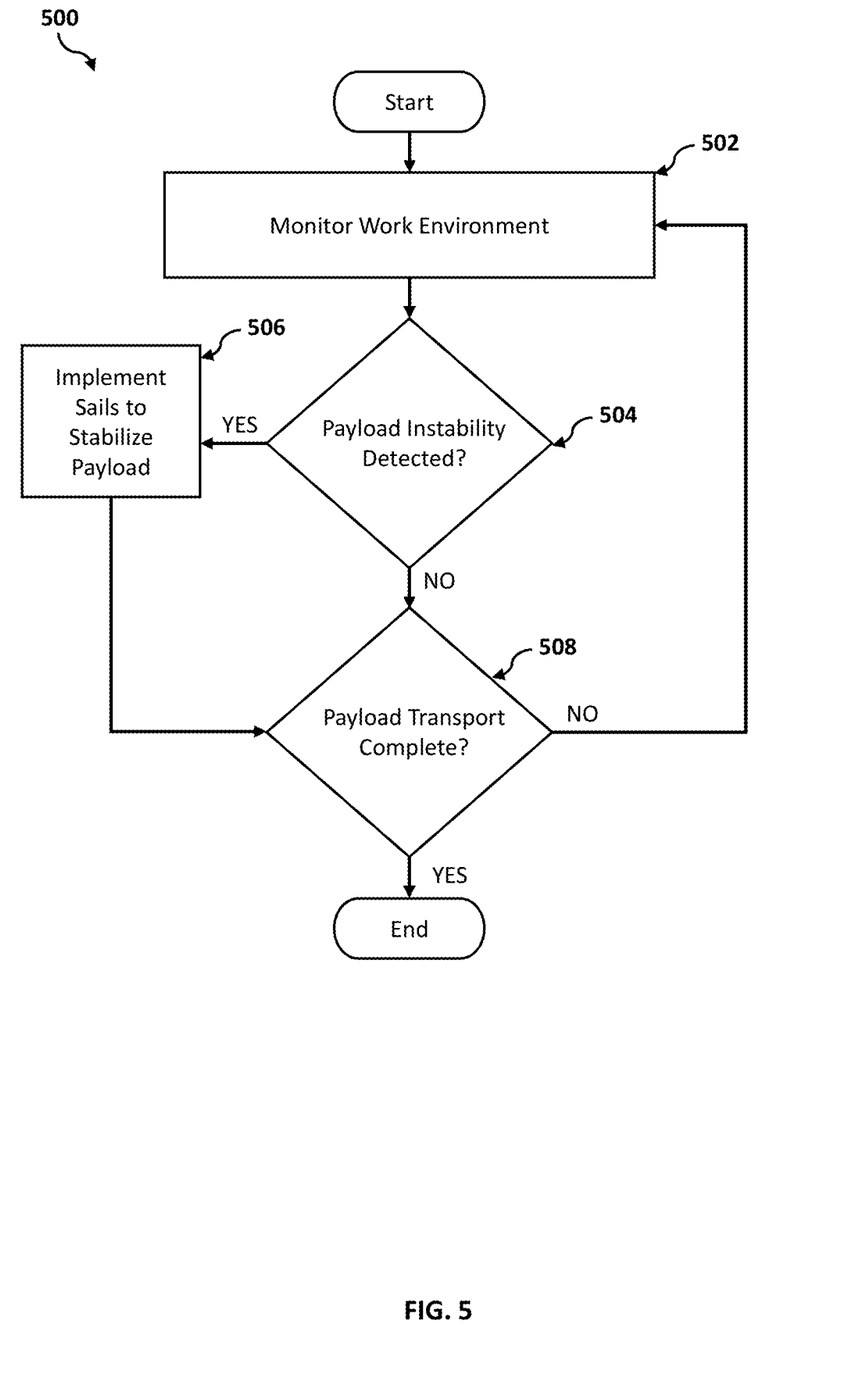
FIG. 5 is an operational flowchart illustrating a stabilization process according to at least one embodiment.

Referring now to FIG. 5, an operational flowchart illustrating the exemplary stabilization process 500 used by the stabilization program 110a, 110b according to at least one embodiment is depicted.

At 502, a work environment is monitored. According to one embodiment, the stabilization program 110a, 110b may monitor the work environment (e.g., work environment 300, 400) based on a first set of movement data received from one or more platform sensors (e.g., platform sensors 204, 312, 412), a second set of weather data received from one or more external weather sensors (e.g., external weather sensors 206, 314, 414), and a third set of imaging data received from one or more image sensors (e.g., image sensors 208, 316, 416), as described previously with reference to FIGS. 2-4. In one embodiment, the stabilization program 110a, 110b may begin monitoring the work environment once a payload (e.g., suspended payload) is loaded onto the platform of the crane.

According to one embodiment, the stabilization program 110a, 110b may receive the movement data from platform sensors, such as, for example, a tilt sensor, a rotation sensor, an accelerometer, a gyroscope, and a wind sensor. The stabilization program 110a, 110b may analyze the received movement data to monitor or track the position and orientation of the platform supporting the suspended payload during the transport of the suspended payload. According to one embodiment, the stabilization program 110a, 110b may receive the weather data from the external weather sensors and analyze the received weather data to determine and track the wind speed and the wind direction in the work environment.

According to one embodiment, the stabilization program 110a, 110b may use the image sensors (e.g., camera) to scan the work environment including the suspended payload. Then, the stabilization program 110a, 110b may use the imaging data received from the image sensors to generate a 3D model of the work environment. In one embodiment, the 3D model of the work environment may include a building model representing one or more buildings in proximity of the suspended payload during the transport of the suspended payload and a payload model representing the suspended payload located on the platform during the transport of the suspended payload. In one embodiment, the stabilization program 110a, 110b may determine, from the payload model, one or more characteristics of the suspended payload (e.g., size, shape, weight, volume of the suspended payload).

In one embodiment, the stabilization program 110a, 110b may use the one or more data received from the platform sensors, external weather sensors, and the image sensors to calculate a predetermined movement for completing a safe transport of the suspended payload. The predetermined movement may include a calculation of how fast the suspended payload may be transported (e.g., hoisted) and a predicted sway of the suspended payload.

Then at 504, the stabilization program 110a, 110b determines if a payload instability is detected. According to one embodiment, the stabilization program 110a, 110b may analyze the movement data received from the platform sensor and the weather data received from the external weather sensor to determine if an unstable movement is detected in the suspended payload.

The stabilization program 110a, 110b may determine that an unstable movement is detected in the suspended payload based on an unstable position and orientation of the platform and by detecting one or more external forces acting on the suspended payload (e.g., wind). If the payload instability (e.g., unstable movement) is detected at 504 (e.g., "Yes" branch), then at 506, the stabilization program 110a, 110b implements one or more sails to stabilize the payload, as described previously with reference to FIGS. 2-4.

For example, in the work environment 300 (FIG. 3), the stabilization program 110a, 110b detects the wind speed and direction (e.g., wind condition W) based on receiving the weather data from the external weather sensor 314. In addition, the stabilization program 110a, 110b detects a tilt in the platform 304 based on receiving the movement data from the platform sensor 312. Based on the movement data received from the platform sensor 312 and the weather data received from the external weather sensor 314, the stabilization program 110a, 110b determines that the unstable movement M1 is detected in the suspended payload 308.

In response to detecting the payload instability at 504, the stabilization program 110a, 110b may implement the sails (e.g., fabric sails 318, rotary sails 418, or combination) to stabilize the suspended payload. According to one embodiment, the stabilization program 110a, 110b may determine (e.g., calculate) a controlled implementation of one or more of the sails to counteract the one or more external forces acting on the suspended payload. According to one embodiment, the stabilization program 110a, 110b may determine whether to deploy the sails or how best to adjust the sails, based on the received sensor data and the 3D models of the work environment.

According to at least one embodiment, the stabilization program 110a, 110b may also provide a user control option (e.g., manual control) which the user may select to enable the user to deploy and/or adjust the sails (e.g., using the client computer 102) based on receiving one or more feedback from the work environment. In another embodiment, the stabilization program 110a, 110b may provide the user with an override option to enable the user to override a determination, by the stabilization program 110a, 110b, as to whether to deploy the sails or how best to adjust the sails.

Continuing with the previous example, the stabilization program 110a, 110b implements the sail control unit 202 to communicate, via communication network 116, with the sail motors 322 to extend the fabric sails 318 from the respective sail masts 320. Then, the stabilization program 110a, 110b implements the sail control unit 202 to perform the rotation R of the fabric sails 318. The sail control unit 202 actuates the sail motors 322 to change the direction of the fabric sails 318 in order to channel the wind in a controllable and predictable direction. By deploying and actuating the fabric sails 318, the stabilization program 110a, 110b stabilizes the detected unstable movement M1 and provides the stable movement M2 of the suspended payload 308 during the transport T of the suspended payload 308.

However, if at 504, the stabilization program 110a, 110b determines that a payload instability is not detected (e.g., "No" branch), then at 508, the stabilization program 110a, 110b determines if a payload transport is complete. According to one embodiment, the stabilization program 110a, 110b may determine that the payload transport is complete if the suspended payload has been transported to a preselected (e.g., by the user) destination in the work environment (e.g., specific location of the building) or based on a user input (e.g., crane operator stops the transport). If at 508, the stabilization program 110a, 110b determines the payload transport is complete (e.g., "Yes" branch), the stabilization process 500 ends. However, if at 508, the stabilization program 110a, 110b determines the payload transport is not complete (e.g., "No" branch), the stabilization process 500 returns to 502 to monitor the work environment until the payload transport is completed.

Continuing with the previous example, the crane operator stops the transport T of the suspended payload 308 when the suspended payload 308 is transported to the $50^{th}$ floor of the building 310. The stabilization program 110a, 110b detects the user input from the crane operator and ends the stabilization process 500.

The functionality of a computer may be improved by the stabilization program 110a, 110b because the stabilization program 110a, 110b may enable a computer, operating a crane to transport a suspended payload, to receive and analyze multi-dimensional data from various sensors and actuate computer-controlled sails to counteract weather conditions which may otherwise pose unsafe conditions when transporting a payload to high elevations. The stabilization program 110a, 110b may enable the computer to detect an unstable movement of the suspended payload during the transport of the suspended payload and implement one or more computer-controlled sails coupled to the suspended payload to stabilize the detected unstable movement of the suspended payload. As such, the stabilization program 110a, 110b may provide safety, speed, performance, and efficiency when elevating suspended payloads using cranes in windy conditions.

It may be appreciated that FIGS. 2-5 provide only an illustration of one embodiment and do not imply any limitations with regard to how different embodiments may be implemented. Many modifications to the depicted embodiment(s) may be made based on design and implementation requirements.

Figure 6:
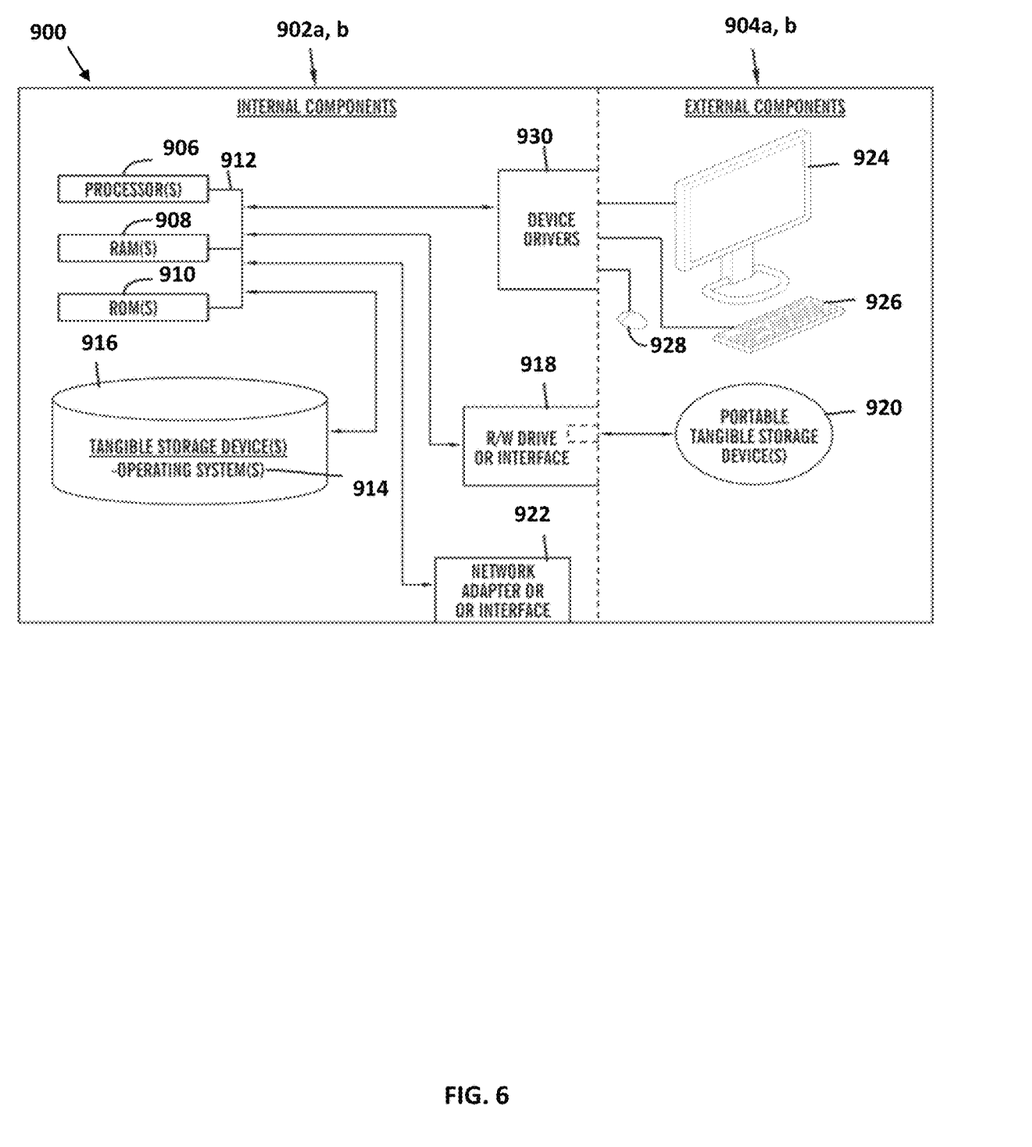
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 6. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the stabilization program 110a in client computer 102, and the stabilization program 110b in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the stabilization program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the stabilization program 110a in client computer 102 and the stabilization program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the stabilization program 110a in client computer 102 and the stabilization program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
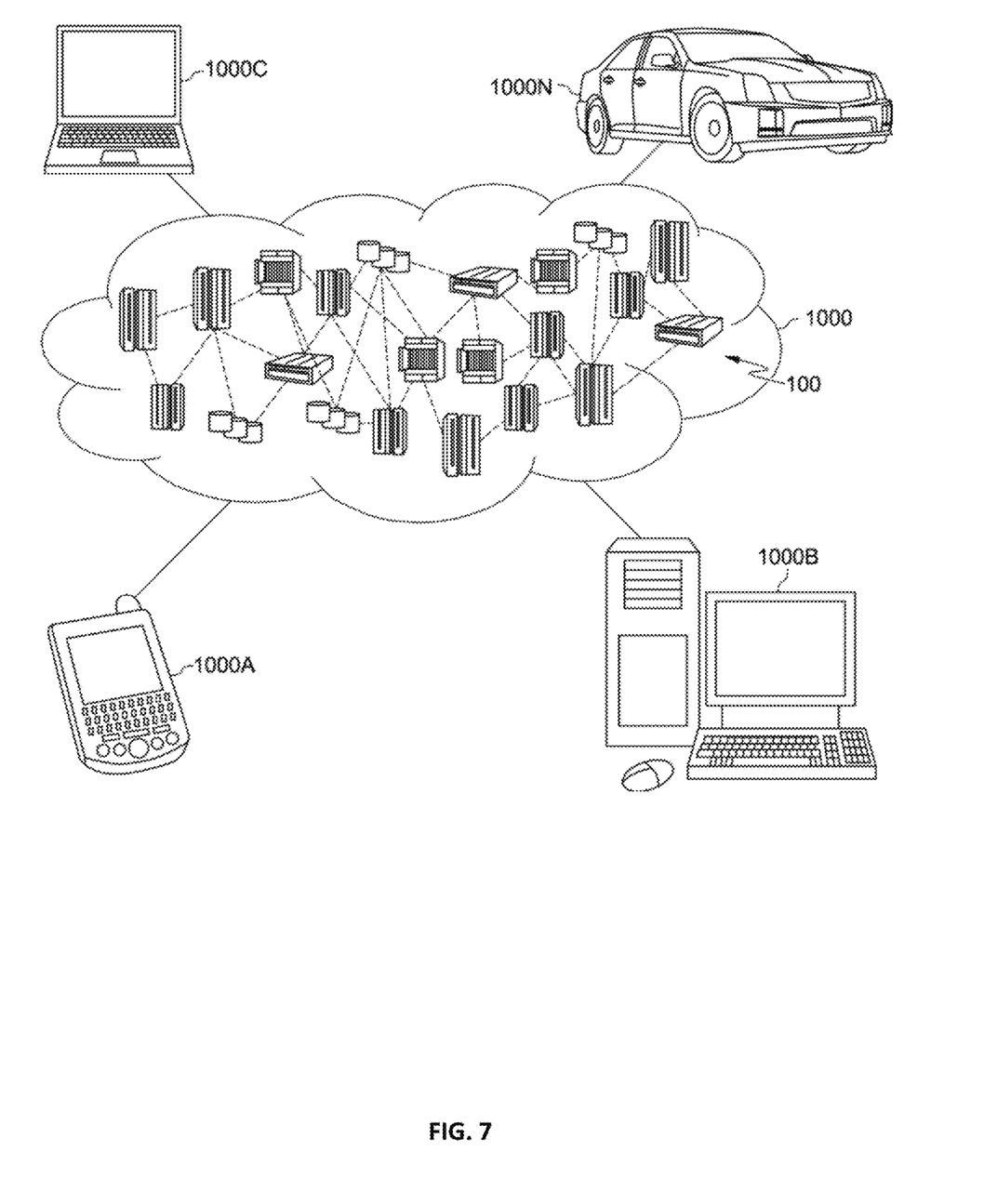
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
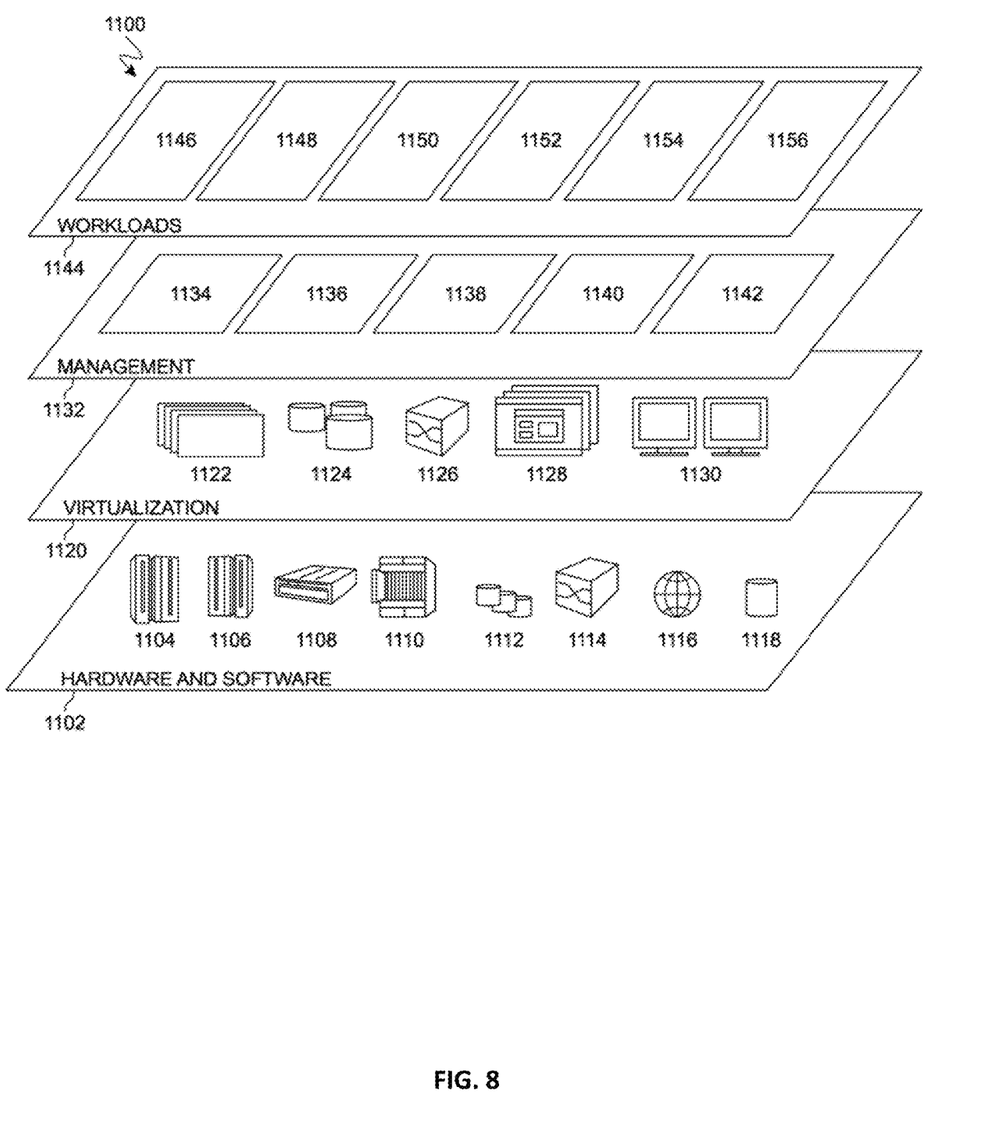
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and stabilization processing 1156. A stabilization program 110*a*, 110*b* provides a way to stabilize a detected unstable movement of a suspended payload.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
in response to receiving at least one sensor data associated with a suspended payload, detecting an unstable movement in the suspended payload during a transport of the suspended payload; and
implementing at least one sail coupled to the suspended payload to stabilize the detected unstable movement of the suspended payload.

2. The method of claim 1, wherein the at least one sensor data associated with the suspended payload is selected from the group consisting of a first set of movement data from at least one platform sensor, a second set of weather data from at least one external weather sensor, and a third set of imaging data from at least one image sensor.

3. The method of claim 2, further comprising:
tracking, based on the first set of movement data from the at least one platform sensor, a position and orientation of a platform supporting the suspended payload during the transport of the suspended payload, wherein the at least one platform sensor is selected from the group consisting of a tilt sensor, a rotation sensor, an accelerometer, a gyroscope, and a wind sensor.

4. The method of claim 2, further comprising:
determining, based on the second set of weather data from the at least one external weather sensor, a wind speed and a wind direction in a work environment.

5. The method of claim 2, further comprising:
generating, based on the third set of imaging data from the at least one image sensor, at least one three-dimensional (3D) model of a work environment, wherein the generated at least one 3D model of the work environment is selected from the group consisting of a building model representing at least one building in proximity of the suspended payload during the transport of the suspended payload and a payload model representing the suspended payload located on a platform during the transport of the suspended payload.

6. The method of claim 2, further comprising:
calculating, based on the at least one sensor data associated with the suspended payload, a predetermined movement of the suspended payload associated with the transport of the suspended payload.

7. The method of claim 2, wherein detecting the unstable movement in the suspended payload further comprises:
detecting, based on the first set of movement data from the at least one platform sensor and the second set of weather data from the at least one external weather sensor, at least one external force acting on the suspended payload.

8. The method of claim 7, wherein implementing the at least one sail coupled to the suspended payload to stabilize the detected unstable movement of the suspended payload further comprises:
determining, based on the first set of movement data from the at least one platform sensor, the second set of weather data from the at least one external weather sensor, and the third set of image data from the at least one image sensor, a controlled implementation of the at least one sail to counteract the at least one external force acting on the suspended payload.

9. The method of claim 1, wherein the at least one sail coupled to the suspended payload is selected from the group consisting of a fabric sail and a rotary sail.

10. A computer system for payload stabilization, comprising:
one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
in response to receiving at least one sensor data associated with a suspended payload, detecting an unstable movement in the suspended payload during a transport of the suspended payload; and
implementing at least one sail coupled to the suspended payload to stabilize the detected unstable movement of the suspended payload.

11. The computer system of claim 10, wherein the at least one sensor data associated with the suspended payload is selected from the group consisting of a first set of movement data from at least one platform sensor, a second set of weather data from at least one external weather sensor, and a third set of imaging data from at least one image sensor.

12. The computer system of claim 11, further comprising:
tracking, based on the first set of movement data from the at least one platform sensor, a position and orientation of a platform supporting the suspended payload during the transport of the suspended payload, wherein the at least one platform sensor is selected from the group consisting of a tilt sensor, a rotation sensor, an accelerometer, a gyroscope, and a wind sensor.

13. The computer system of claim 11, further comprising:
determining, based on the second set of weather data from the at least one external weather sensor, a wind speed and a wind direction in a work environment.

14. The computer system of claim 11, further comprising:
generating, based on the third set of imaging data from the at least one image sensor, at least one three-dimensional (3D) model of a work environment, wherein the generated at least one 3D model of the work environment is selected from the group consisting of a building model representing at least one building in proximity of the suspended payload during the transport of the suspended payload and a payload model representing the suspended payload located on a platform during the transport of the suspended payload.

15. The computer system of claim 11, further comprising:
calculating, based on the at least one sensor data associated with the suspended payload, a predetermined movement of the suspended payload associated with the transport of the suspended payload.

16. The computer system of claim 11, wherein detecting the unstable movement in the suspended payload further comprises:
detecting, based on the first set of movement data from the at least one platform sensor and the second set of weather data from the at least one external weather sensor, at least one external force acting on the suspended payload.

17. The computer system of claim 16, wherein implementing the at least one sail coupled to the suspended payload to stabilize the detected unstable movement of the suspended payload further comprises:
determining, based on the first set of movement data from the at least one platform sensor, the second set of weather data from the at least one external weather sensor, and the third set of image data from the at least one image sensor, a controlled implementation of the at least one sail to counteract the at least one external force acting on the suspended payload.

18. The computer system of claim 10, wherein the at least one sail coupled to the suspended payload is selected from the group consisting of a fabric sail and a rotary sail.

19. A computer program product for payload stabilization, the computer program product comprising a computer readable storage medium having program instructions embodied therewith, the program instructions executable by a processor to cause the processor to:
in response to receiving at least one sensor data associated with a suspended payload, detect an unstable movement in the suspended payload during a transport of the suspended payload; and
implement at least one sail coupled to the suspended payload to stabilize the detected unstable movement of the suspended payload.

20. The computer program product of claim 19, wherein the at least one sensor data associated with the suspended payload is selected from the group consisting of a first set of movement data from at least one platform sensor, a second set of weather data from at least one external weather sensor, and a third set of imaging data from at least one image sensor.

* * * * *